United States Patent
Yukihiro et al.

[11] Patent Number: 5,945,047
[45] Date of Patent: Aug. 31, 1999

[54] METHOD OF INJECTION-COMPRESSION MOLDING

[75] Inventors: Makoto Yukihiro; Tatsuyuki Koujin; Tadanori Obayashi, all of Hiroshima; Hideaki Shimada, Kyoto, all of Japan

[73] Assignee: The Japan Steel Works, Ltd., Tokyo, Japan

[21] Appl. No.: 09/041,801

[22] Filed: Mar. 13, 1998

[30] Foreign Application Priority Data

Mar. 13, 1997 [JP] Japan ..................................... 9-078873
Apr. 14, 1997 [JP] Japan ..................................... 9-111955

[51] Int. Cl.⁶ .................................................. B29C 45/80
[52] U.S. Cl. ....................... 264/40.5; 264/328.7; 425/150
[58] Field of Search .................................. 264/40.1, 40.5, 264/40.7, 328.1, 328.7, 328.11; 425/145, 149, 150

[56] References Cited

U.S. PATENT DOCUMENTS

| | | | |
|---|---|---|---|
| 4,301,100 | 11/1981 | Farrell | 264/40.5 |
| 4,345,890 | 8/1982 | Hemmi et al. | 264/40.5 |
| 4,685,876 | 8/1987 | Loscei | 425/150 |
| 4,849,151 | 7/1989 | Tamura et al. | 425/150 |
| 5,338,171 | 8/1994 | Hayakawa et al. | 425/138 |
| 5,853,773 | 12/1998 | Choi | 425/150 |

FOREIGN PATENT DOCUMENTS 6-285936  10/1994  Japan .
6-297527  10/1994  Japan .

Primary Examiner—Jill L. Heitbrink
Attorney, Agent, or Firm—Oblon, Spivak, McClelland, Maier & Neustadt, P.C.

[57] ABSTRACT

The present invention provides a method of injection-compression molding which employs an injection-compression molding machine. According to the method, molten resin is injected to fill in a mold placed in a closed state at an injection mold opened position of a predetermined mold opening stroke "a", thereafter the mold is pressed for closing and compressing until the mold reaches the final mold clamping position. The method comprises the steps of, based on the correlation between the elongation of a tie bar and an mold opening stroke of the mold in the injection process, detecting the elongation of the tie bar caused by injection pressure from injection starting time to injection completion time; calculating the mold opening stroke based on the detected elongation of the tie bar to advance a movable mold by the stroke which offsets the mold opening stroke, thereby holding the mold at the injection mold opened position of the predetermined mold opening stroke "a".

2 Claims, 3 Drawing Sheets

METHOD OF INJECTION-COMPRESSION MOLDING

BACKGROUND OF THE INVENTION

1. Field of the Invention

The present invention relates to a method of injection-compression molding using an injection-compression molding machine.

2. Description of the Related Art

A method of injection-compression molding using a conventional injection-compression molding machine comprises an injection process of placing a fixed mold and a movable mold (hereinafter referred to as a "mold") in a closed state at an injection mold opened position which corresponds to a state opened by a predetermined mold opening stroke relative to a final mold clamping position to be taken when a compression process is completed, and injecting molten resin to fill in a cavity of the mold placed in the closed state at the injection mold opened position; and a compression process for compressing the mold, following the injection process, by pressing the mold in the closed state until the mold reaches the final mold clamping position.

However, according to the above conventional technique, in case an injection-compression molding machine provided with a toggle type mold clamping apparatus is used, when molten resin is injected to fill in the cavity of the mold placed in the closed state at the injection mold opened position, a tie bar of the machine is elongated due to the injection pressure of the molten resin concurrently causing a link shrinkage, and hence the mold opening stroke is increased more than that of the injection mold opened position by a stroke corresponding to the sum of the tie bar elongation and the link shrinkage. Further, with an injection-compression molding machine provided with a straight hydraulic mold clamping apparatus, the tie bar is elongated and a clamping ram is concurrently contracted, and hence the mold opening stroke is increased more than that of the injection mold opened position by a stroke corresponding to the sum of the elongation of the tie bar and the contraction of the clamping ram. When the mold opening stroke is increased in the injection process in this way, a minute relative slip is generated between the mold and a skin layer which is produced when the injection-filled molten resin is cooled by the mold, resultantly deteriorating the transferability which is a merit of the injection-compression molding method. More particularly, the deterioration of the transferability is undesirably when producing a mold such as a Fresnel lens or a light guide plate which has minute surface gradation.

SUMMARY OF THE INVENTION

An object of the present invention is to provide a method of injection-compression molding of good transferability.

Another object of the present invention is to provide a method of injection-compression molding which can eliminate a minute slip to be generated during resin filling operation in the injection process between a mold and a skin layer which is produced when molten resin is solidified.

The present invention relates to a method of injection-compression molding using an injection-compression molding machine and injecting the molten resin to fill in a mold placed in a closed state at an injection mold opened position of a predetermined mold opening stroke and thereafter compressing the mold by pressing it in the closed state to the last mold clamping position.

According to a first aspect of the present invention, an injection-compression molding method is provided, based on the correlation between the elongation of a tie bar and an opening stroke of the mold in the injection process, for detecting the elongation of the tie bar to be caused by injection pressure from injection starting time to injection completion time, calculating the mold opening stroke based on the detected elongation of the tie bar to advance a movable mold by a stroke which can offset the mold opening stroke, thereby holding the mold at the injection mold opened position.

According to a second aspect of the present invention, there is provided a method which performs test molding in advance to obtain a mold opening stroke variation characteristic in the injection process for the period from the time the mold opening stroke begins to increase, after a certain time has elapsed after injection, until the time the injection is completed and the compression is started, and the method which holds a mold in the injection process of the real molding operation at the injection mold opened position by closing the mold by a stroke as large as the mold closing stroke corresponding to the mold opening stroke variation characteristic previously obtained.

The above and other objects, features and advantages of the present invention will become apparent from the following description based on the accompanying drawings which illustrated an example of a referred embodiment of the present invention.

DETAILED DESCRIPTION OF THE PREFERRED EMBODIMENTS

Now, a preferable embodiment of the present invention will be described.

A First Embodiment

A first embodiment of the present invention will be described with reference to the drawings.

Figure 1:
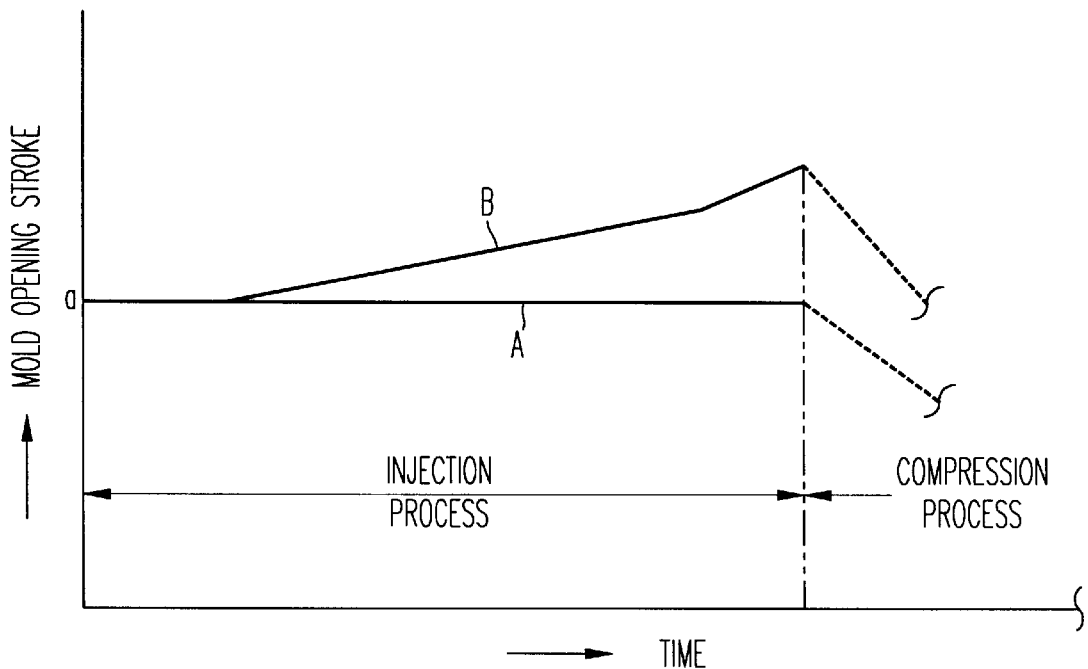
FIG. 1 is a graph showing the relation between the mold opening stroke and the time with reference to an injection-compression molding method of a first embodiment of the present invention and a conventional injection-compression molding method.

With a method of injection-compression molding using a conventional injection-compression molding machine, when a mold is placed in a closed state at an injection mold opened position of a predetermined mold opening stroke, and molten resin is injected to fill in a cavity of the mold placed in this position, the opening stroke of the mold begins to augment due to the injection pressure as the molten resin is filled in the cavity, as shown in the mold opening stroke variation characteristic B of FIG. 1.

However, with reference to either a toggle type mold clamping apparatus or a straight hydraulic mold clamping apparatus, there is established the correlation for each of them in the injection process between the elongation of a tie bar and the shrinkage of a link or a clamping ram, and hence the shrinkage of the link or the clamping ram can be calculated based on the elongation of the tie bar according to the operation formula predetermined for each, and in its turn, each mold opening stroke to be caused by the above injection pressure can be calculated.

Accordingly, the injection-compression molding method of the present invention allows to hold the mold during the injection process at the injection mold opened position of the mold opening stroke "a" as shown in FIG. 1 with a line A, by detecting the elongation of the tie bar generated due to the injection pressure, calculating the mold opening stroke based on the detected elongation of the tie bar, closing the mold by advancing a movable plate of the injection-compression molding machine by a stroke for offsetting the mold opening stroke for the period from the injection start time to the injection completion time in the injection process.

Then, after the injection process is completed, the compression process is performed by clamping the mold from the injection mold opened position of the opening stroke "a" to the final mold clamping position for closing and clamping in one step or in plural steps.

Figure 2:
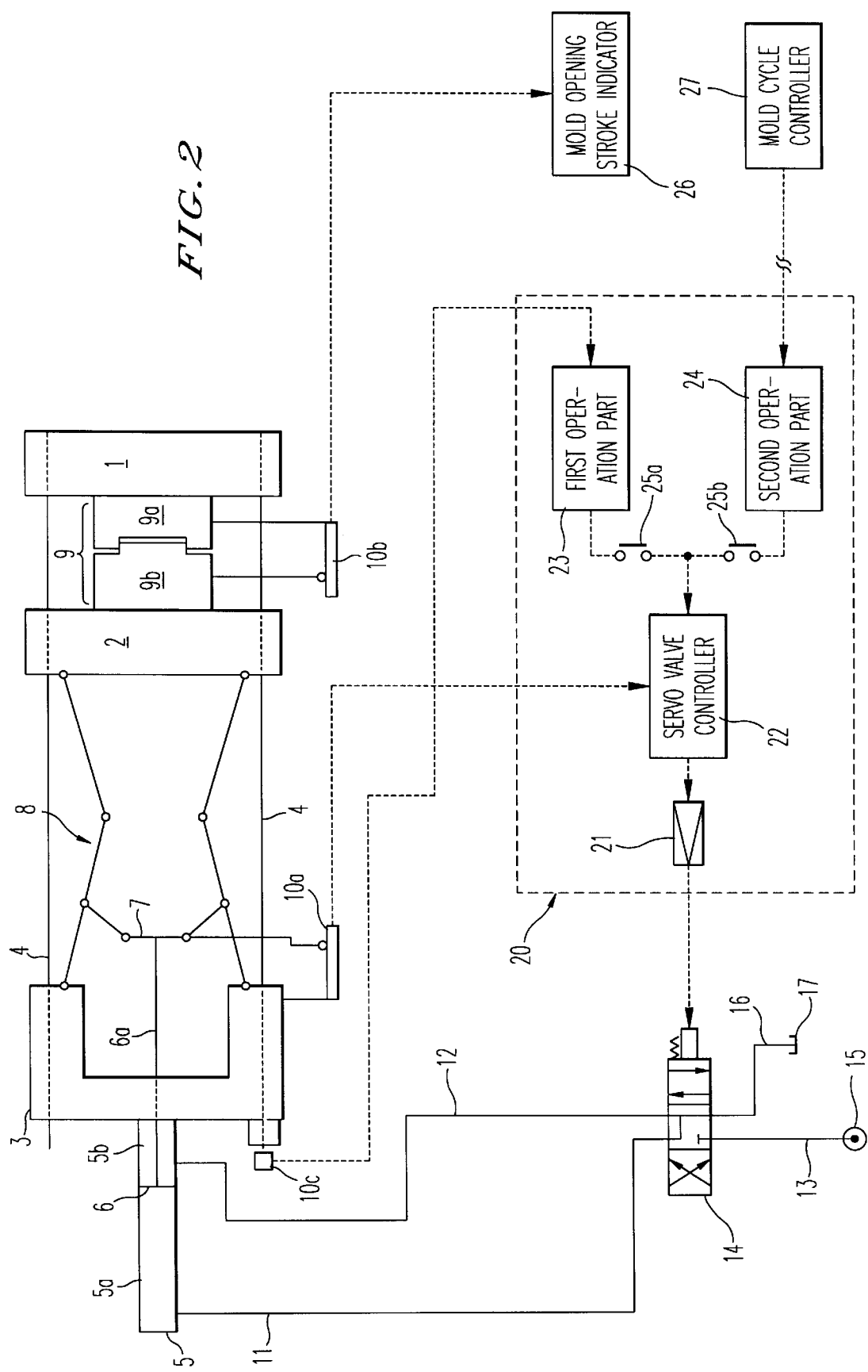
FIG. 2 is an explanatory view showing an injection-compression molding machine provided with a toggle type mold clamping apparatus to be used for implementing the injection-compression molding method of the first embodiment of the present invention.

FIG. 2 is a explanatory view showing an example of an injection-compression molding machine provided with a toggle type mold clamping apparatus to be used for implementing the injection-compression molding method of the first embodiment of the present invention. The injection-compression molding machine comprises fixed plate 1 and mold clamping housing 3 provided with a fixed space on a base not shown, a plurality of tie bars 4 connecting fixed plate 1 and mold clamping housing 3, movable plate 2 disposed on tie bar 4 between fixed plate 1 and mold clamping housing 3 being axially movably guided, and toggle link mechanism 8 elastically connecting mold clamping housing 3 and movable plate 2, wherein toggle link mechanism 8 is connected to crosshead 7 fixed to the tip of rod 6a of piston 6 of mold clamping cylinder 5.

Mold clamping cylinder 5 is structured such that it has chamber 5a for mold closing use communicated with one end of first pipeline 11 and chamber 5b for mold opening use communicated with one end of second pipeline 12, the other ends of first pipeline 11 and second pipeline 12 are alternatively communicated through servo valve 14, respectively, with discharge pipeline 13 of oil hydraulic pump 15 and drain pipeline 16 whose other end is open to tank 17.

Control unit 20 connected to servo valve 14 comprises servo valve controller 22 connected to servo valve 14 through servo amplifier 21, first operation part 23 and second operation part 24 parallelly connected to servo valve controller 22, first switch 25a interposed between first operation part 23 and servo valve controller 22, and second switch 25b interposed between second operation part 24 and servo valve controller 22. Further, molding cycle controller 27 is connected to second operation part 24 for controlling the whole process of the injection-compression molding operation.

Mold clamping housing 3 comprises crosshead position detector 10a for detecting the position of crosshead 7 and tie bar elongation detector 10c for detecting the elongation of tie bar 4. Mold 9 consisting of fixed mold 9a and movable mold 9b has mold opening stroke detector 10b for detecting the mold opening stroke in the molding cycle to indicate the stroke on mold opening stroke indicator 26.

The method of injection-compression molding of the present invention will be described using, as an example, the injection-compression molding machine provided with the toggle type mold clamping apparatus shown in FIG. 2.

(1) At the start of molding, according to instruction from molding cycle controller 27 for controlling the whole process of the injection-compression molding operation, first switch 25a is opened and concurrently second switch 25b is closed to connect servo valve controller 22 and second operation part 24. Second operation part 24 converts the mold opening stroke "a" sent from molding cycle controller 27 to the corresponding crosshead position and send it to servo valve controller 22. Servo valve controller 22 outputs a servo valve control signal to servo valve 14 through servo amplifier 21, for making the position of crosshead 7 detected by crosshead position detector 10a coincide with the crosshead position sent from second operation part 24. Accordingly, servo valve 14 is switched to a mold closing port to introduce the pressure oil into mold closing chamber 5a, and then crosshead 7 advances together with piston 6 and piston rod 6a to close the mold at the injection mold opened position of the mold opening stroke "a".

(2) Following the above process (1), according to the instruction from molding cycle controller 27, second switch 25b is opened and first switch 25a is closed to connect first operation part 23 and servo valve controller 22, and concurrently the injection of molten resin into the cavity of mold 9 is started.

(3) After finishing the above process (2), as the molten resin is injected and filled in the cavity, tie bar 4 elongates due to the injection pressure and accompanying which the link contracts. Then, the elongation of the tie bar is detected by tie bar elongation detector 10c and inputted to first operation part 23, where the detected elongation of the tie bar is converted to the crosshead position for offsetting the mold opening stroke produced due to said injection pressure. Servo valve controller 22 outputs a servo valve control signal to servo valve 14 through servo amplifier 21, for making the position of crosshead 7 detected by crosshead position detector 10a coincide with the crosshead position sent from first operation part 23. Accordingly, servo valve 14 is switched to a mold closing port to introduce the pressure oil into mold closing chamber 5a, and then crosshead 7 advances by the stroke for offsetting the mold opening stroke generated by the above injection pressure, and in its turn, movable plate 2 is advanced by the stroke for offsetting the mold opening stroke calculated based on the detected elongation of the tie bar. Resultantly, during the injection process, mold 9 is maintained in the state stopped in the injection mold opened position of the opening stroke "a".

(4) Next, after the process (3), based on such as the injection termination instruction from molding cycle controller 27, the injection is stopped and concurrently first switch 25a is opened and second switch 25b is closed to connect servo valve controller 22 and second operation part 24. Accordingly, crosshead 7 is advanced instructed by a compression process control signal sent from molding cycle controller 27, and through the mold closing and clamping operation performed during the mold travels from the injection mold opened position to the final mold clamping position, the mold is compressed.

It is to be noted that when the injection-compression molding machine provided with a straight hydraulic mold clamping apparatus is used, the injection-compression molding operation is to be performed in accordance with the above process by providing a mold clamping ram position detector or a movable plate position detector instead of the above crosshead position detector 10a.

A Second Embodiment

A second embodiment of the present invention will be described with reference to the drawings.

Description will be made with regard to, as an example, the injection-compression molding method which uses the injection-compression molding machine provided with the toggle type mold clamping apparatus. As shown by a mold opening stroke variation characteristic B in FIG. 3, when the molten resin is injected to fill in a cavity of a mold placed in a closed state at an injection mold opened position which corresponds to a state opened by a predetermined mold opening stroke "a" relative to a final mold clamping position to be taken when a compression process is completed, being caused by the injection pressure, the elongation of the tie bar and the shrinkage of the link start when time t1 has elapsed since the injection starting time, concurrently a movable plate begins to shift toward the mold opening direction accompanying the elongation of the tie bar and the shrinkage of the link, and during the time period until the injection completion or the compression starting time t2, the mold opening stroke increases from the opening stroke "a" to "b".

Figure 3:
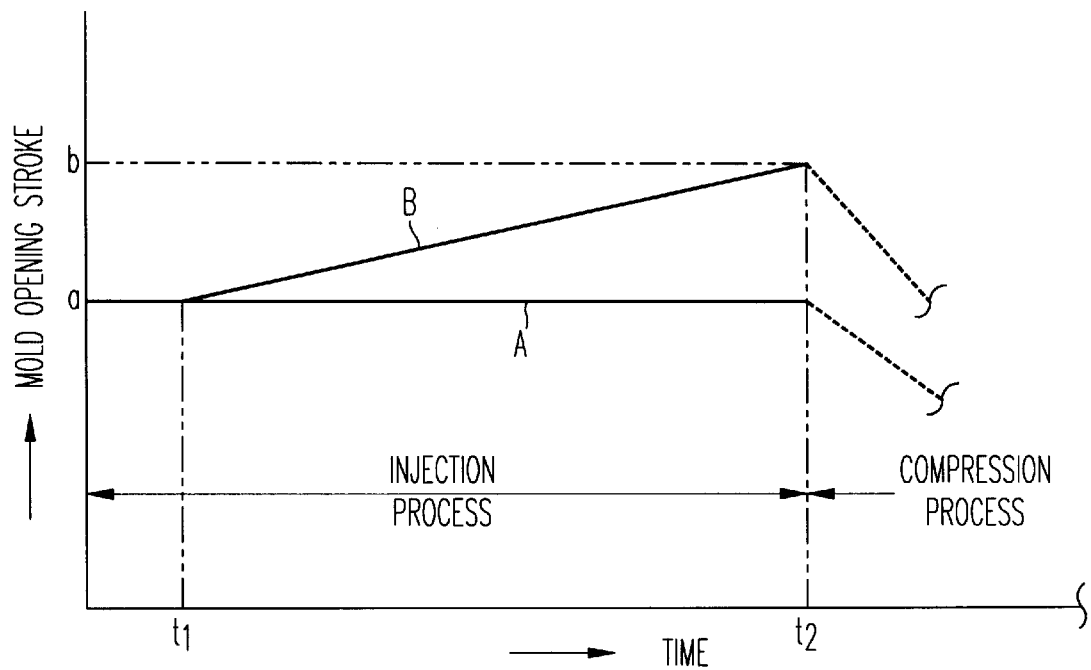
FIG. 3 is a graph showing the relation between the mold opening stroke and the time with reference to an injection-compression molding method of a second embodiment of the present invention and the conventional injection-compression molding method.

Therefore, by preliminarily performing a test molding, the injection-compression molding method of the present invention calculates the mold opening stroke variation characteristic B of the mold in said injection process corresponding to the period from the time when time t1 has elapsed after the injection starting time until the injection completion or the compression starting time t2, the time t1 being the time at which the mold opening stroke begins to increase. Then in the injection process of the real molding operation, by closing the mold with the stroke equivalent to the mold closing stroke corresponding to said mold opening stroke variation characteristic B during the period between the time when time t1 has elapsed since the injection starting time and the injection completion or the compression starting time t2, the time t1 being the time at which the mold opening stroke starts to increase, keep the mold during the injection process at the injection mold opened position of the mold opening stroke "a" as shown in FIG. 3 with a line A.

In other words, by performing the mold closing operation equivalent to the mold opening stroke which corresponds to (b−a) of the mold opening stroke variation characteristic B for the period of (t2−t1) which commences at the time when time t1, at which the mold opening stroke begins to increase after a certain time has elapsed since the injection starting time and ends at the injection completion time or the compression starting time t2, it can offset the mold opening stroke produced accompanying such as the elongation of the tie bar and the shrinkage of the link described above, thereby keeping the mold through the injection process accurately at the injection mold opened position of the opening stroke "a".

Then, after the injection process is completed, the compression process is performed by closing and clamping the mold from the injection mold opened position of the opening stroke "a" to the final mold clamping position in one step or in plural steps.

Figure 4:
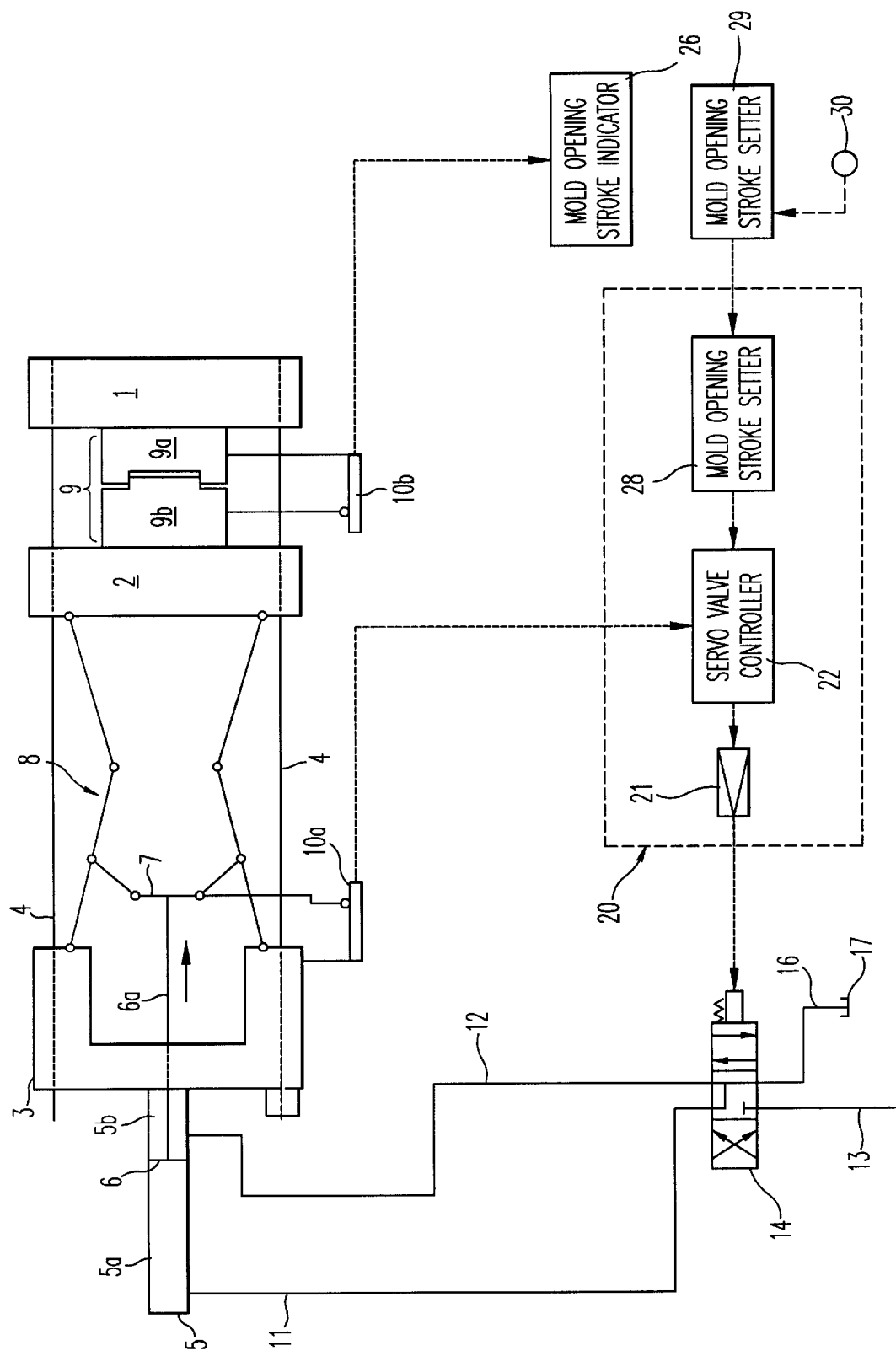
FIG. 4 is an explanatory view showing an injection-compression molding machine provided with a toggle type mold clamping apparatus to be used for implementing the injection-compression molding method of the second embodiment of the present invention.

FIG. 4 is an explanatory view showing an example of the injection-compression molding machine provided with the toggle type mold clamping apparatus to be used for implementing the injection-compression molding method of the second embodiment of the present invention. Description of the part which is the same as or equivalent to that of the first embodiment is omitted.

In the present embodiment, control unit 20 connected to servo valve 14 comprises, for performing the mold closing to the extent equal to the mold closing stroke which corresponds to (b−a) of the mold opening stroke variation characteristic B set in mold opening stroke setter 29, crosshead position converter 28 for converting the mold opening stroke to the crosshead advancement position, servo valve controller 22 for outputting a signal for controlling servo valve 14 through servo amplifier 21 so that the position of the crosshead 7 detected by crosshead position detector 10a can be advanced to said crosshead advancement position sent from said crosshead position converter 28. It is to be noted that said mold opening stroke setter 29 also serves as a compression force setter.

Further, mold 9 consisting of fixed mold 9a and movable mold 9b is provided with mold opening stroke detector 10b for detecting the mold opening stroke in the molding cycle and indicating the detected result on mold opening stroke indicator 26. Timer 30 is connected to said mold opening stroke setter 29.

Now, description will be made with reference to the injection-compression molding method of the present embodiment concerning the case, as an example, which uses the injection-compression molding machine provided with the toggle type mold clamping apparatus shown in FIG. 4.

(1) Prior to performing the real molding, a test molding is performed as follows to obtain the mold opening stroke variation characteristic B for the period from the time when time t1 has elapsed since the injection started until to the injection completion or the compression starting time t2, t1 being the time at which the mold opening stroke begins to increase.

After attaching mold 9 to fixed plate 1 and movable plate 2, the mold is placed in a closed state at an injection mold opened position of a mold opening stroke "a" which is set in accordance with the molding condition to be determined for each molding item, then molten resin is injected to fill in a cavity of mold 9 placed in the closed state at this mold opened position. In this injection process, the mold opening strokes at the injection start time through at the injection completion or the compression start time are detected by mold opening stroke detector 10b attached to mold 9 and displayed on mold opening stroke indicator 26 as the mold opening stroke variation characteristic B (see FIG. 3).

(2) After finishing the above process (1), the mold opening stroke variation characteristic B is set on mold opening stroke setter 29, and concurrently time t1 at which the mold opening stroke starts to increase and the injection completion or the compression starting time t2 are set on timer 30, respectively.

(3) Next to the above process (2), the real molding is started. By first switching servo valve 14 to a mold closing port according to such as instructions from a molding cycle controller not shown to introduce the pressure oil from discharge pipeline 13 into mold closing chamber 5a through first pipeline 11, a group of piston 6, rod 6a and crosshead 7 is advanced in the direction of an arrow to place mold 9 in the closed state at the injection mold opened position of the opening stroke "a".

(4) Following the above process (3), the injection start instruction is issued from said molding cycle controller to start the injection of the molten resin, on the other hand timer 30 functions to switch so that servo valve 14 can be controlled by control unit 20 during the period (t2−t1), that is, from the time when time t1, at which the mold opening stroke begins to increase after a certain time has elapsed since the injection starting time until the injection completion or the compression start time t2.

(5) Succeeding the above process (4), controller unit 20 controls servo valve 14 by outputting, in accordance with the mold opening stroke variation characteristic B, a signal for performing the mold closing with a stroke equivalent to the mold closing stroke which corresponds to said (b−a), during the period from the time when time t1 has elapsed since the injection starting time until the injection completion or the compression starting time t2. Accordingly, piston 6, rod 6a and crosshead 7 are advanced and the mold closing is performed with a stroke equivalent to the mold closing stroke which corresponds to said mold opening stroke variation characteristic B. As a result, mold 9 is held still at the injection mold opened position during the injection process.

(6) After the above process (5), the injection operation is stopped by the injection stop instruction issued from said molding cycle controller, and on the other hand, timer 30 turns off at the injection completion or the compression start time t2, thereby switching servo valve 14 so that it is controlled according to a compression process control signal to close and clamp mold 9 from the injection mold opened position of the predetermined mold opening stroke to the final mold clamping position to complete the compression.

It is to be noted that when the injection-compression molding machine provided with a straight hydraulic mold clamping apparatus is used, the injection-compression molding operation is to be performed in accordance with the above process by providing a movable plate or mold clamping ram position detector and a movable plate or clamping ram position converter or the like instead of the above crosshead position detector 10a and crosshead position converter 28.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of injection-compression molding comprising the steps of:

placing a mold in a closed state at an injection mold opened position which corresponds to a state opened by a predetermined mold opening stroke relative to a final mold clamping position to be taken when a compression process is completed, and injecting molten resin to fill in a cavity of said mold placed in said closed state at said injection mold opened position; and following said injection process, compressing said mold for closing and compressing until said mold reaches said final mold clamping position; said method further comprising the steps of:

detecting the elongation of a tie bar to be caused by injection pressure from injection starting time to injection completion time in said injection process;

calculating said mold opening stroke based on said detected elongation of said tie bar to advance a movable mold by a stroke which offsets said mold opening stroke, thereby holding said mold at said injection mold opened position.

2. A method of injection-compression molding comprising the steps of:

placing a mold in a closed state at an injection mold opened position which corresponds to a state opened by a predetermined mold opening stroke relative to a final mold clamping position to be taken when a compression process is completed, and injecting molten resin to fill in a cavity of said mold placed in said closed state at said injection mold opened position; and following said injection process, compressing said mold for closing and compressing until said mold reaches said final mold clamping position; said method further comprising the steps of:

performing test molding in advance to obtain a mold opening stroke variation characteristic of said mold in said injection process for the period from the time said mold opening stroke begins to increase, after a certain time has elapsed after injection, until the time the injection is completed and the compression is started; and then closing said mold, in said injection process in a real forming operation, by a stroke as large as the mold closing stroke corresponding to said mold opening stroke variation characteristic previously obtained, thereby holding said mold at said injection mold opened position.

* * * * *